United States Patent
Fischer

[15] 3,691,184
[45] Sept. 12, 1972

[54] CERTAIN 2-ALKOXYMETHYL-3-CHLORO-Δ 3-1,2,4-THIADIAZOLIN-5-ONES AND THEIR PREPARATION

[72] Inventor: Peter Fischer, Odenthal-Osenau, Germany

[73] Assignee: Farbenfabriken Bayer Aktiengesellschaft, Leverkusen, Germany

[22] Filed: May 18, 1970

[21] Appl. No.: 38,577

[30] Foreign Application Priority Data

May 21, 1969 Germany..........P 19 25 995.1

[52] U.S. Cl. ................260/302 D, 71/90, 260/566 R
[51] Int. Cl. .................................................C07d 91/60
[58] Field of Search..................................260/302 D

*Primary Examiner*—Alex Mazel
*Assistant Examiner*—R. J. Gallagher
*Attorney*—Burgess, Dinklage & Sprung

[57] ABSTRACT

2-Alkoxymethyl-3-chloro-Δ³-1,2,4-thiadiozolin-5-ones are obtained when a carbodiimide of the formula $R^1O-CH_2-N$ 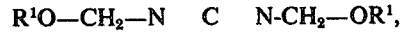 $C$  $N-CH_2-OR^1$, in which $R^1$ is an aliphatic radical, is reacted with chlorocarbonylsulphenyl chloride in the presence of an inert, organic diluent in the temperature range of 0° to 100° C and the diluent and the chloromethylalkyl ether liberated on heating are removed at a temperature in the region of 50° to 120°C. The new compounds are useful as herbicides.

15 Claims, No Drawings

CERTAIN 2-ALKOXYMETHYL-3-CHLORO-Δ 3-1,2,4-THIADIAZOLIN-5-ONES AND THEIR PREPARATION

The invention relates to new 2-alkoxymethyl-3-chloro-$\Delta^3$-1,2,4-thiadiazolin 5-ones and to a process for their preparation.

It has been found that a 2-alkyloxymethyl-3-chloro-$\Delta^3$-1,2,4-thiadiazolin 5-ones is obtained when a carbodiimide of the formula:

$$R^1O-CH_2-N=C=N-CH_2-OR^1,$$

in which $R^1$ is an aliphatic radical, is reacted with chlorocarbonylsulphenyl chloride in the presence of an inert, organic diluent in the temperature range of 0° to 100°C and the diluent and the chloromethylalkyl ether liberated on heating are then removed at a temperature in the region of 50° to about 120° C.

The reactants are generally used in approximately the stoichiometric ratios although chlorocarbonylsulphenyl chloride may be used in an excess of up to about 20 percent if desired. In this case the excess chlorocarbonylsulphenylchloride may then be removed by distillation together with the solvent and the chloromethylalkylether liberated in the reaction.

The reaction is preferably carried out in a temperature range of 20° to 90°C.

The aliphatic radicals are straight chained and optionally branched alkyl radicals having from one to eight and preferably from one to four carbon atoms. Cycloalkyl radicals having from five to 12 and preferably five to six carbon atoms in the ring system are, of course, also understood to be aliphatic radicals. Examples of aliphatic radicals are methyl, ethyl, n-propyl, i-propyl, n-butyl and the tertiary butyl or n-octyl radical as well as the cyclopentyl and cyclohexyl radical.

The carbodiimides used for the process may be prepared by the known methods, for example by condensation of the corresponding isocyanates with liberation of $CO_2$ in the presence of a phosphorus catalyst. Chlorocarbonyl sulphenyl chloride is a known compound.

The following are mentioned as examples of carbodiimides which may be used for the process: Bis-(methoxymethyl)-carbodiimide; bis-(ethoxymethyl)-carbodiimide; bis-(N-propoxymethyl)-carbodiimide; bis-(isobutoxymethyl)-carbodiimide, bis(cyclopentyloxymethyl)-carbodiimide; bis-(cyclohexyloxymethyl)-carbodiimide and bis-(n-octyloxymethyl)-carbodiimide.

Suitable diluents for the process are, for example, hydrocarbons and chlorinated hydrocarbons such as hexane, benzene, toluene, chlorobenzene, carbon tetrachloride or chloroform. The removal of the solvents which have a boiling point above 100°C. being carried out at reduced pressure within the given temperature range of about 50° to about 120°C.

The process will now be explained with the aid of the following Example:

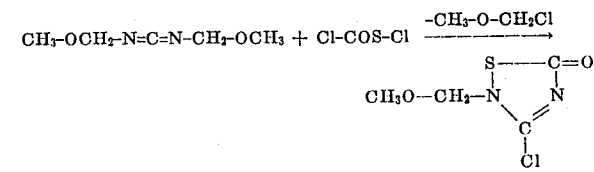

The reaction mixture is processes in the conventional manner. The new compound remaining behind as a residue which is isolated in the conventional manner by distillation at a reduced pressure or by extraction with a low boiling, optionally chlorinated hydrocarbon such as hexane or chloroform, and it may be purified by recrystallization.

The new compounds correspond to the general formula

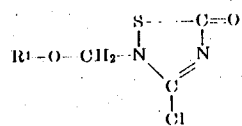

in which $R^1$ is an aliphatic radical.

In the IR spectrum, the new compounds show a characteristic double band between 1070 and 1720 $cm^{-1}$. The new compounds are valuable for subsequent reactions and may also be used directly as herbicides.

EXAMPLE 30 g. of chlorocarbonylsulphenyl chloride are added to 30 g. of bis-(methoxymethyl)-carbodiimide, b.p. 60°C/4 mm. Hg., in 300 ml. of benzene, and the reaction mixture is boiled for one-half hour and processed by distillation.

Yield: 30 g. of 2-methoxymethyl-3-chloro-$\Delta^3$-1,2,4-thiadiazolin-5-ones, b.p. 80°–84°C/0.2-0.3 mm Hg; solidification point 45.8°C.

Analysis: (Molecular weight 180.6)

| | C | H | O | N | S | Cl |
|---|---|---|---|---|---|---|
| Calculated: | 26.6% | 2.79% | 17.7% | 15.6% | 17.8% | 19.6% |
| Found: | 26.5% | 2.8% | 18.1% | 16.0% | 18.2% | 19.1% |

The following 2-alkoxymethyl-3-chloro-$\Delta^3$-1,2,4-thiadiazolin-5-ones may be obtained in an analogous manner:

| Alkyl | Bp/mm Hg S.P. °C | S.P. °C | calculated found: N | N S | S | Cl Cl | Mol.wt. Mol.wt. |
|---|---|---|---|---|---|---|---|
| Ethyl | 90°/0.6 | 42.6 | 14.4 / 14.2 | | | 18.1 / 18.3 | 194.5 |
| n-Propyl | 90°/0.2 | – | 13.4 / 14.1 | 15.4 / 15.4 | | 17.0 / 16.7 | 208.5 / 216 |
| i-Propyl | 85°/0.1 | – | 13.4 / 13.5 | 15.4 / 14.8 | | 17.0 / 16.1 | 208.5 / 208 |
| n-Butyl | 100°/0.3 | – | 12.6 / 12.8 | 14.4 / 14.4 | | 15.9 / 15.5 | 222.7 / 223 |
| i-Butyl | 105°/0.5 | – | 12.6 / 12.7 | 14.4 / 14.5 | | 15.9 / 15.3 | 222.7 / 216 |
| n-Octyl+ | – | – | 10.0 / 9.8 | 11.3 / 10.5 | | 12.7 / 11.9 | 278.9 / 269 |
| | | | 0 | S | | Cl | Mol.wt. |
| Cyclohexyl+ | – | – | 12.9 / 12.9 | 12.9 / 13.2 | | 14.3 / 14.3 | 248.7 |

+Preparations purified by thin layer chromatography.

The following alkoxymethylchlorothialmidazolones mentioned as examples prevent the growth of food plants when used in the form of an aqueous preparation containing 0.2 percent of the active substance (0 = no effect, 5 = total destruction after 3 weeks):

| alkyl = | millet | beet | oats | cotton | wheat | mustard | beans |
|---|---|---|---|---|---|---|---|
| methyl | 3 | 5 | 3 | 4 | 2 | 4–5 | 2 |
| i-propyl | 3 | 5 | 2 | 0 | 3 | 5 | 2 |
| n-butyl | 2 | 3 | 1 | 0 | 4 | 5 | 3 |

| | | | | | | | |
|---|---|---|---|---|---|---|---|
| i-butyl | 3 | 3 | 2 | 1 | 3 | 5 | 2 |
| n-octyl | 4 | 4 | 2 | 0 | 4 | 5 | 0 |

The other compounds obtainable by the process show a similar herbicidal action.

The carbodiimides (a) used for the process and their starting compounds (b and c) were prepared as follows:

a. Preparation of the carbodiimides

Carbon dioxide is liberated from 160 g. of isopropoxymethylisocyanate by the addition of 2 g. of 1-phenyl-3-methyl-1-phosphacyclopentene-(3)-P-oxide with heating. The evolution of gas is completed after heating for 2 hours at 120°C. and a further 2 hours at 150°C. 75 g. of pure bis-isopropoxymethylcarbodiimide, b.p. 60°C./0.1 mm Hg. are obtained by fractional distillation.

The following bis-alkoxymethyl-carbodiimides are obtained in a similar manner from the corresponding isocyanates

| Alkyl = | | |
|---|---|---|
| | ethyl | b.p. 68°C/0.5 mm Hg. |
| | n-Propyl | b.p. 87°C/0.2 mm Hg. |
| | n-Butyl | b.p. 80°C/0.1 mm Hg. |
| | i-Butyl | b.p. 80°C/0.1 mm Hg. |
| | n-Octyl | b.p. 160°C/0.3 mm Hg. | b. Preparation of the isocyanate 490 g. of isopropyl chloromethylether and 132 g. of benzyl cyanide dissolved in 550 g. of a hydrocarbon fraction which boils at 190° to 210°C. are reacted with 530 g. of sodium cyanate at a temperature in the range of 100° to 120°C. After 7 hours, a filtered sample is found to contain only traces of chlorine. After cooling, the reaction mixture is filtered and fractionated. Yield: 340 g. of isopropoxymethylisocyanate, b.p. 65°C/104 mm Hg.

The following compounds are obtained in a similar manner (see British Pat. No. 1,104,917 and U.S. Patent No. 3,453,310) from the corresponding alkyl chloromethylethers by reacting them with sodium cyanate in a mixture of a polar and a non-polar solvent:

| | |
|---|---|
| Ethoxymethylisocyanate | b.p. 108°C/760 mm Hg. |
| n-Propoxymethylisocyanate | b.p. 80° C/144 mm Hg. |
| Isobutoxymethylisocyanate | b.p. 66°C/50 mm Hg. |
| n-Octyloxymethylisocyanate | b.p. 70°C/ 0.5 mm Hg. |
| Cyclohexyloxymethylisocyanate | b.p. 100°C/27 mm Hg. | c. Chloromethylether

Hydrogen chloride is introduced to saturation point into a solution of 270 g. of trioxane, 540 g. of isopropanol and 500 g. of benzene, the reaction mixture being at the same time cooled with ice. Two layers are formed. After separation of the aqueous phase, the organic phase is dried over calcium chloride and distilled. 500 g. of isopropyl chloromethylether of b.p. 43°C/100 mm Hg are obtained.

The following are obtained in a similar manner:

| | |
|---|---|
| n-Propylchloromethyl ether | b.p. 50°C/115 mm Hg. |
| Isobutylchloromethylether | b.p. 105°C/ 60 mm Hg. |
| Cyclohexylchloromethylether | b.p. 43°C/0.3 mm Hg. |

What we claim is:

1. 2-Alkoxymethyl-3-chloro-Δ³-1,2,4-thiadiazolin-5-ones of the formula

wherein R¹ is selected from the group consisting of alkyl with up to eight carbon atoms and cycloalkyl with five to 12 carbon atoms in the ring system.

2. Compounds according to claim 1 in which R¹ is an aliphatic radical selected from the group consisting of alkyl with up to four carbon atoms and cycloalkyl with five or six carbon atoms in the ring system.

3. Δ³-1,2,4-thiadiazolin-5-ones according to claim 1 wherein R¹ is selected from the group consisting of ethyl, n-propyl, isopropyl, n-butyl, isobutyl, n-octyl, and cyclohexyl.

4. Compound according to claim 1:
2-Ethoxymethyl-3-chloro-Δ³-1,2,4-thiadiazolin-5-one.

5. Compound according to claim 1:
2-n-Propoxymethyl-3-chloro-Δ³-1,2,4-thiadiazolin-r-one.

6. Compound according to claim 1:
2-Isopropoxymethyl-3-chloro-Δ³-1,2,4-thiadiazolin-5-one.

7. Compound according to claim 1:
2-n-Butoxymethyl-3-chloroΔ³-1,2,4-thiadiazolin-5-one.

8. Compound according to claim 1:
2-Iso-butoxymethyl-3-chloro-Δ³-1,2,4-thiadiazolin-5-one.

9. Compound according to claim 1:
2-n-Octyloxymethyl-3-chloro-Δ³-1,2,4-thiadiazolin-5-one.

10. Compound according to claim 1:
2-Cyclohexyloxymethyl-3-chloro-Δ³-1,2,4-thiadiazolin-5-one.

11. A process for the preparation of a 2-alkoxymethyl-3-chloro-Δ³-1,2,4-thiadiazolin-5-ones, wherein a carbodiimide of the formula $$R^1O-CH_2-N = C = N-CH_2-OR^1,$$

wherein R¹ is selected from the group consisting of alkyl with up to eight carbon atoms and cycloalkyl with five to 12 carbon atoms in the ring system, is reacted with chlorocarbonylsulphenylchloride in the presence of an inert organic diluent at a temperature in the range of from 0° to 100°C, and wherein the diluent and chloromethylalkylether which is liberated on heating are removed at a temperature in the range of from 50° to 120°C.

12. A process according to claim 11, wherein the aliphatic radical contains from one to 12 carbon atoms.

13. A process according to claim 11, wherein the chlorocarbonyl sulphonyl chloride is used in an excess of up to 20 percent based on the stoichiometric ratio, and wherein this excess is removed by distillation together with the solvent and the chloromethylalkylether liberated in the reaction.

14. A process according to claim 11, wherein the inert organic diluent is a hydrocarbon.

15. A process according to claim 11, wherein the carbodiimide is bis-(methoxymethyl)-carbodiimide.

* * * * *